United States Patent [19]

Wilson

[11] 4,314,103
[45] Feb. 2, 1982

[54] TELEPHONE ANSWERING SYSTEM WITH SIMULATED DIAL TONE DISCONNECT PROTECTION

[75] Inventor: Donald R. Wilson, Santa Cruz, Calif.

[73] Assignee: Plantronics, Inc., Santa Cruz, Calif.

[21] Appl. No.: 151,295

[22] Filed: May 19, 1980

Related U.S. Application Data

[62] Division of Ser. No. 947,095, Sep. 29, 1978, abandoned.

[51] Int. Cl.³ .................................................. H04M 1/65
[52] U.S. Cl. ............................... 179/6.11; 179/1 MN; 179/6.15; 179/6.18; 179/6.14
[58] Field of Search ..................... 179/6.07, 6.11, 6.15, 179/6.18, 6.20, 6.09, 6.17, 6.02, 1 MN, 5 R

[56] References Cited

U.S. PATENT DOCUMENTS

| | | | |
|---|---|---|---|
| 3,647,985 | 3/1972 | Langendorf et al. | 179/6.09 |
| 3,715,518 | 2/1973 | Campbell et al. | 179/6.11 |
| 3,725,589 | 4/1973 | Golden | 179/6.09 |
| 3,899,645 | 8/1975 | Brafman | 179/5 R |
| 3,927,260 | 12/1975 | Amundson et al. | 179/1 MN |
| 3,978,289 | 8/1976 | Konno | 179/6.11 |
| 4,086,434 | 4/1978 | Bocchi | 179/5 R |
| 4,150,255 | 4/1979 | Theis et al. | 179/6.17 |
| 4,160,125 | 7/1979 | Bower et al. | 179/6.02 |

Primary Examiner—Bernard Konick
Assistant Examiner—Donald McElheny, Jr.
Attorney, Agent, or Firm—Arnold, White & Durkee

[57] ABSTRACT

An automatic telephone answering system wherein disconnection from the telephone line following calling party hang up is in response to the detection of dial tone, utilizes a signal detector responsive to voice and steady tone signals for providing an indication of the status of an incoming signal on the telephone line, and a processor for monitoring line signal status to determine the presence of dial tone. Following a determination of the presence of dial tone as an incoming line signal, the processor acts to automatically disconnect the system from the telephone line by opening a telephone line connection relay. The determination of dial tone is made based upon the continuous existence, over a predetermined time interval, of an incoming line signal status representative of a steady tone signal, rather than an absolute, single event detection. An automatic telephone answering and message recording system having remote access message playback, and which disconnects from the telephone line in response to dial tone, further includes processor actuated circuitry for inserting a blank interval in an incoming line signal prior to being recorded. The circuitry is actuated upon a determination by the processor that the incoming line signal is a steady tone signal, the determination being made based upon the existence, over a predetermined time interval, of an incoming line signal status representative of a steady tone signal. The duration of the time interval for such determination being a shorter period than the duration of the time interval for a dial tone determination.

1 Claim, 3 Drawing Figures

TELEPHONE ANSWERING SYSTEM WITH SIMULATED DIAL TONE DISCONNECT PROTECTION

This is a divisional of application Ser. No. 947,095, filed Sept. 29, 1978, now abandoned.

BACKGROUND OF THE INVENTION

The present invention relates to improvements in automatic telephone answering systems; and more particularly, the present invention relates to apparatus for detecting dial tone on the telephone line after the calling party hangs up, and in response thereto disconnecting from the telephone line.

At the present time there are various types of systems which automatically answer an incoming call and hold a telephone line connection which are broadly defined as "automatic telephone answering systems". Included in this category of apparatus are automatic telephone message recording equipment, automatic telephone call forwarding equipment, automatic dial-up alarm receiving equipment, and automatic answering data entry systems. In each of these systems, some means is included for establishing a connection to the telephone line. Typically, closure of a line seizure relay is utilized to make the connection upon the occurrence of an incoming call. Disconnection from the telephone line is accomplished by opening the line seizure relay in response to a condition interpreted as calling party hanging up.

It has been common practice in prior art automatic telephone answering systems, particularly automatic telephone message recording equipment, to control the opening of the line seizure relay with a "calling party control" (CPC) relay. The CPC relay is so interconnected with the line seizure relay that while a calling party maintains his telephone set in an "off-hook" condition, electrical current exists in the CPC relay coil and the line seizure relay maintains a connection to the telephone line. When the calling party hangs up, the CPC relay coil becomes deenergized, with resulting disconnection from the telephone line. This manner of disconnecting from the telephone line upon hang up of a calling party relies upon the detection of breaks in the subscriber loop-current.

Difficulty arises, however, with loop-current break detection of caller hang up in that apparatus is required which is capable of sensing breaks as short as 8 milliseconds. Despite the utilization of elaborate loop-current break sensing apparatus, detection of loop-current breaks and disconnection from the telephone line is frequently much later than the actual point of caller hangup at the point of switching to the central-offices "permanent signal" buss.

An alternative is to detect dial-tone and disconnect in response thereto. In the prior art dial-tone detection has been by a tunable tone receiver added to the system. Effective dial tone detection requires a tone receiver which does not falsely indicate a dial tone detection from other line signals, such as voice signals. Thus, dial tone receivers by necessity comprise complex filter circuitry and, as a result, add measurably to the necessary system hardware.

Also, disconnection from the telephone line in response to the detection of dial tone with a tone receiver, regardless of the sophistication of the circuit design, does not provide a safeguard against inadvertent disconnection in response to transient signals appearing on the line. Furthermore, in a message recording system having remote access message playback, dial tone detection by a tone receiver is susceptible to causing an inadvertent disconnect in response to simulated dial tone (i.e., dial tone previously recorded on the message tape and output during playback).

SUMMARY OF THE INVENTION

The present invention provides for the disconnection of an automatic telephone answering system from the telephone line in response to calling party hang up as evidenced by the existence of dial tone on the telephone line.

In one aspect of the invention, following the answering of an incoming call, incoming line signal status is provided and thereafter monitored, with the answering system being automatically disconnected from the telephone line upon a determination of the presence of dial tone as the incoming line signal. The determination of dial tone is made based upon a continuous existence, over a prescribed interval, of an incoming line signal status indication representative of a steady tone.

An important feature of this aspect of the invention is that in a message recording system the voice detection circuitry can be utilized to provide incoming line signal status.

In another aspect of the invention, a message recording system having remote access message playback can be provided with the capability to distinguish real dial tone from simulated dial tone, which exists during playback of dial tone previously recorded on the message recorder, and thereby disconnect from the telephone line only upon the existence of real dial tone.

Apparatus in accordance with the present invention for inclusion in an automatic telephone answering system having means establishing connection to a telephone line utilizes a signal detector responsive to dial tone and information carrying line signals to provide incoming line signal status after connection is made to the telephone line and a processor for monitoring the incoming line signal status to determine the presence of dial tone based upon the existence, over a predetermined time interval, of an incoming line signal indication representative of a steady tone signal. After the presence of dial tone is determined, the line connection means is caused to automatically disconnect from the telephone line.

Further in accordance with the present invention, apparatus for inclusion in a message recording system having remote access message playback, and which disconnects upon the occurrence of dial tone, utilizes voice detection circuitry responsive to voice and dial tone signals to provide an indication of incoming line signal status. A processor monitors the line signal status during message recording to ascertain the existence, over a predetermined interval, of a status indication that a steady tone signal is the incoming line signal. In response to the existence of a steady tone status indication for a predetermined interval, processor controlled means modifies the incoming line signal by inserting a blank interval of a prescribed duration in the incoming line signal being recorded.

DESCRIPTION OF A PREFERRED EMBODIMENT

Although the present invention can be utilized in a variety of automatic telephone answering systems wherein a connection is made to the telephone line and the system is subsequently disconnected after the calling party hangs up, the presentation of the detailed description of one embodiment of the invention will be made with regard to an automatic telephone message recording system. Such equipment includes a pair of tape decks, one for recording and playing back an announcement to a calling party, and the other for recording and playing back the messages of calling parties. Control circuitry is further included for sequencing the operation of the tape recorders. Finally, automatic telephone answering equipment includes ring sensing and line interface circuitry.

Figure 1:
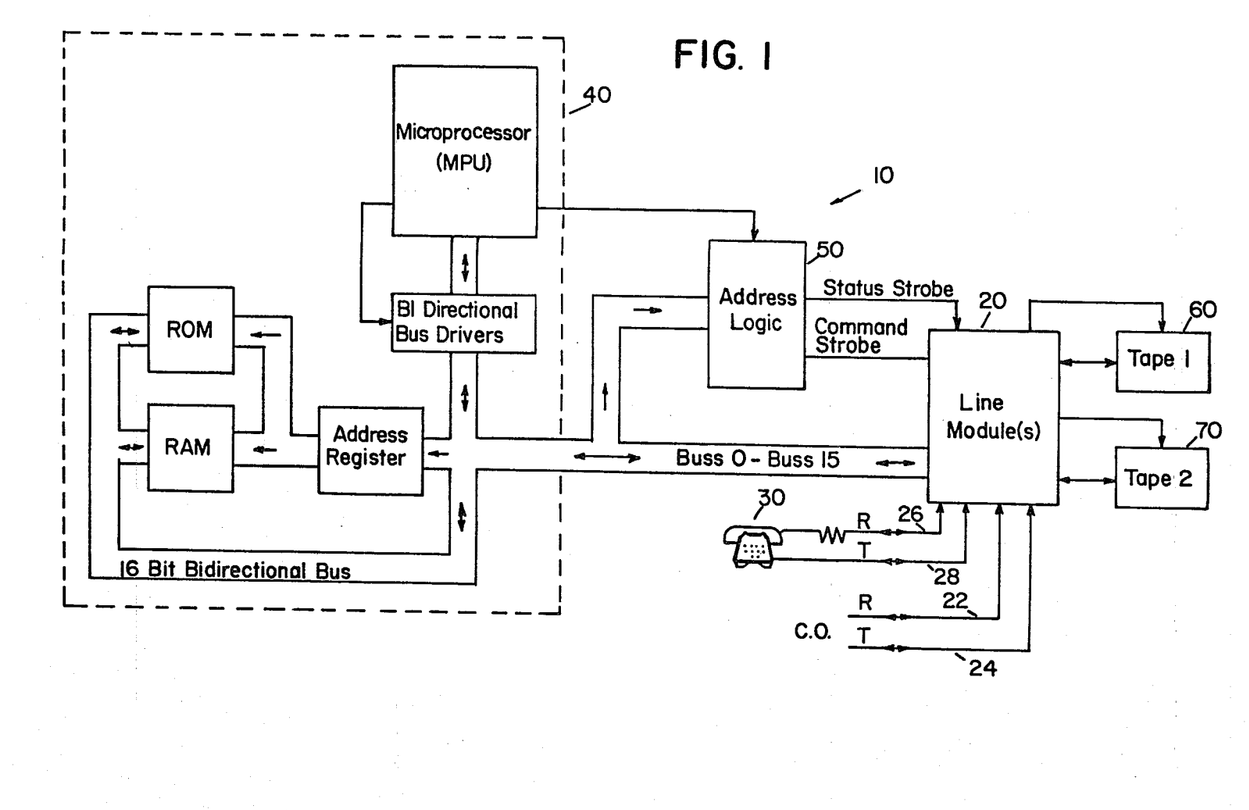
FIG. 1 is a block diagram of an automatic telephone answering and message recording system in which the present invention may be incorporated.

Referring now to FIG. 1, a block diagram of an automatic telephone answering system is presented. The particular system shown is one adapted for utilization as a part of a central office automatic telephone answering system wherein a number of subscribers are connected into a central office. The system 10 includes a line module 20 connected to the central office via ring and tip lines 22, 24 and to the subscriber's telephone 30 subscriber via lines 26 and 28. A central office automatic telephone answering system comprises a number of line modules, each of which serves one subscriber. To simplify the diagram of FIG. 1, only a single line module is shown.

A processor 40 is provided to control the operation of the line module(s) 20. Processor 40 as shown comprises a microcomputer set which includes a 16-bit single-chip microprocessor. The microprocessor (MPU) may, for example, be a National Semiconductor IPC-16A/500D device. The microcomputer set implementing processor 40 further includes the usual associated read only memories and random access memories which communicate with the MPU over a 16-bit bidirectional bus via bidirectional bus drivers.

Processor 40 communicates with line module(s) 20 over a 16 bit-bidirectional bus. Address logic 50 providing STATUS STROBE and COMMAND STROBE signals to a respective line module is required for a central office telephone answering system having a plurality of subscriber line modules.

Under the direction of processor 40, line module 20 functions to sense and signal an incoming call, and transfer information between subscriber telephone 30 and message tape 60 or announce tape 70. In addition, line module 20 provides information to processor 40 relative to the operating conditions of the respective subscriber telephone answering equipment.

Figure 2:
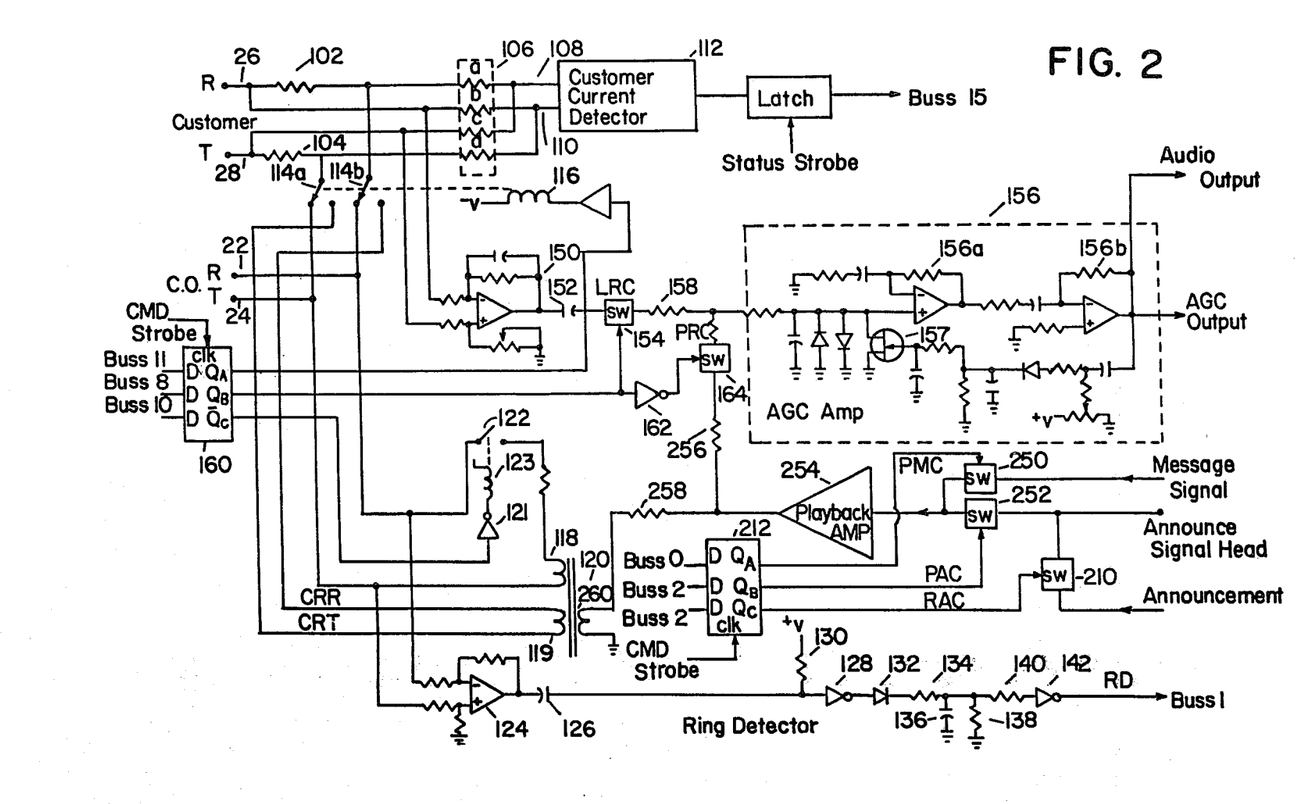
FIG. 2 is a schematic diagram of circuitry for the line module portion of the system of FIG. 1.
Figure 3:
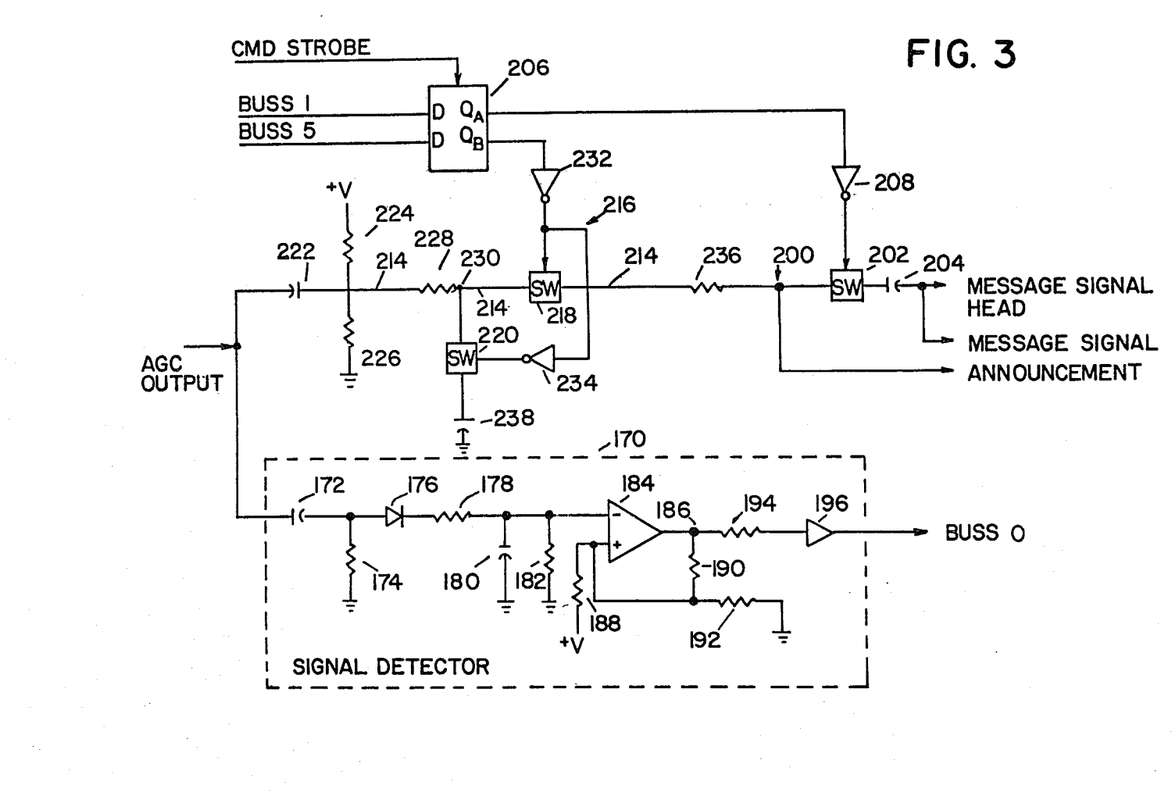
FIG. 3 is a schematic diagram of additional circuitry for the line module portion of the system of FIG. 1.

In FIGS. 2 and 3, a subscriber's line module 20 is shown in more detail with specific electronic circuitry for implementing the module being presented.

Referring first to FIG. 2, subscriber telephone lines 26, 28 connect through resistors 102 and 104, respectively, to a resistor network 106. Subscriber telephone lines 26, 28 also connect directly to resistor network 106. Resistors a-d of network 106 cross-connect to provide two input lines 108, 110 to customer current detector 112, which detects on-hook and off-hook conditions on the subscriber line. An indication of the status of the subscriber telephone 30 is transmitted via buffer 113 and provided to processor 40 over BUSS 15.

Subscriber telephone lines 26, 28 are further connected via resistors 102, 104 to the center poles of dual DPST relays 114A and 114B, which are actuated by relay coil 116. Relays 114 in the normal, de-energized state connect the subscriber telephone lines to central office ring and tip lines 22 and 24. In addition, the interconnected subscriber telephone lines and the central office lines connect to a secondary winding 118 of audio transformer 120. The circuit path of secondary winding 118 includes in one leg thereof a normally open relay contact 122 which serves as the line seizure relay for the telephone answering system.

Further connected to the ring and tip lines 22, 24 is ring detector circuitry for detecting the ringing signals for an incoming call to the subscriber's telephone 30. It will be appreciated that the incoming line signal to the subscriber is being routed through the central office of the telephone company. The ring detector comprises a differential amplifier circuit 124 which senses the presence of a ringing voltage between lines 22, 24. The output of amplifier 124 is applied via capacitor 126 to inverter 128, the input of which is tied to a pull-up resistor 130. The output of inverter 128 is applied through diode 132 to a filter circuit comprising resistor 134, capacitor 136 and resistor 138. The output of the filter is applied via resistor 140 to inverting buffer 142, the output of which drives buffer 143 which supplies the ring detect (RD) signal to processor 40 via BUSS 1.

An incoming line signal over lines 22, 24 is applied to an isolation amplifier circuit 150. The output of isolation amplifier 150 is coupled via capacitor 152 to the input of a solid state switch 154. If the incoming line signal is to be passed to the automatic gain control (AGC) amplifier shown in block 156, a line record command (LRC) will condition switch 154 to pass the signal to resistor 158. The line receive command is obtained from the $Q_B$ output of storage register 160. The data stored in register 160 is command information from processor 40 output over the bidirectional bus and stored in register 160 at the occurrence of a COMMAND STROBE.

The $Q_B$ output of storage register 160 is also applied to inverter 162 which controls switch 164. With the arrangement shown, either switch 154 or switch 164 is closed and permits passage of a signal therethrough. The operation of switch 164 will be discussed more fully hereinafter with regard to the routing of playback signals within line module 20. Both switches 154, 164 are electronic analog CMOS switches available under the designation 4016.

AGC amplifier 156 stabilizes the amplitude of the incoming line signal from isolation amplifier 150. Generally, AGC 156 comprises cascaded amplifier sections 156A, 156B in combination with a control element shown as a field effect transistor 157 which automatically changes the gain of the amplifier circuit. AGC amplifier 156 maintains an average output level of approximately 2.5 volts RMS despite variations in the output signal level of isolation amplifier 150.

Referring next to FIG. 3, the stabilized incoming line signal available from the AGC amplifier is made available to the message and announce tape recorders for recording of the incoming signal, and is further made available to signal detector 170.

In the particular embodiment illustrated, signal detector 170 is utilized to produce incoming line signal status indicative of the presence of an information carrying signal (i.e., voice or data) or the presence of another signal of constant frequency and amplitude (i.e., dial tone). Signal detector 170 in the embodiment shown provides incoming line signal status in the form of a binary signal output. For example, a fluctuating signal (such as voice) produces a pattern of "lows" and "highs" representative of binary "zeros" and "ones". A steady tone signal (such as dial tone) produces a continuous "low" output, that is a logic "zero". No signal at all produces a continuous "high".

With specific reference to the particular circuitry shown in FIG. 3 for signal detector 170, the stabilized incoming line signal from the AGC amplifier is applied to capacitor 172 which removes any DC component and suppresses 60 Hertz signals. Resistor 174 at the input of signal detector 170 provides a DC path to ground, and diode 176 rectifies the AC signal. Resistor 178 and capacitor 180 form a "low-pass" filter with a time constant of approximately 3.9 milliseconds. A relatively short time constant in the signal detector circuit is preferable for proper voice detection. Capacitor 180 in combination with resistor 182 form a discharge path with a time constant of approximately 6.8 milliseconds. Level detector 184 operates on the voltage applied to the inverting and non-inverting inputs to produce a "low" (i.e., a logic zero) output at node 186 when the voltage on the inverting input is more positive than the voltage on the non-inverting input. Correspondingly, level detector 184 produces a "high" (i.e., a logic one) output when the inverting input is less positive than the non-inverting input. Resistors 188, 190 and 192 provide a threshold voltage level on the non-inverting input and provide a small amount of positive feedback to provide a rapid switching action. The binary output signal is applied via resistor 194 to a non-inverting buffer 196 which drives BUSS 0 to provide the line signal status developed by signal detector 170 to processor 140. Table I below provides preferred valued for the various components of signal detector 170.

TABLE I

| Capacitor | 172 | .1 uf |
| Resistor | 174 | 4.7 K OHM |
| Diode | 176 | 1N4148 |
| Resistor | 178 | 39 K OHM |
| Capacitor | 180 | .1 uf |
| Resistor | 182 | 68 K OHM |
| Level Detector | 184 | LM 1458 |
| Resistor | 188 | 1 Meg OHM |
| Resistor | 190 | 10 Meg OHM |
| Resistor | 192 | 10 K OHM |
| Resistor | 194 | 4.7 K OHM |
| Buffer | 196 | SN 7417 |

Processor 40 monitors incoming signal status available from signal detector 170 to determine the presence or absence of voice and the presence of dial tone. Because processor 40 is implemented with a microcomputer set, timing algorithms are utilized to make these determinations. It is to be understood, however, that the determinations may be made in other ways than through the use of software algorithms. For example, processor 40 can be suitably implemented in random, hard-wired logic with the output of signal detector 170 being provided as one input thereto. In the event that hardwired logic is utilized rather than a microcomputer set, the determinations of voice, no voice and dial tone would be made using combination and sequential logic hardware in place of a software program.

Dial tone detection in accordance with the voice/dial tone detection algorithm basically involves a determination that an incoming line signal status representative of dial tone has continuously existed for a predetermined interval. In the preferred embodiment shown, if the output of signal detector 170 goes low and stays low for a period of six seconds, processor 40 will consider a dial tone detection to have occurred. If, however, voice detect goes low and a typical period of not less than 33 milliseconds nor more than 160 milliseconds exists from a previous low detect, processor 40 will consider the incoming signal to be voice. If the output of signal detector 170 is not changing or is changing at intervals of longer than 160 Ms or shorter than 33 Ms, no-voice timing is started and continues until it is reset upon a determination by the processor that voice is present. If either no-voice timing reaches a prescribed duration (e.g., twelve seconds) or dial tone detection is considered to have occurred, the connection to the telephone lines would be disconnected in a manner to be described later herein. Although a time interval of six seconds is preferred for making a determination of dial tone, an interval of from four to eight seconds can be successfully utilized. Program listings for the voice/dial tone detect algorithm and for the "CPC" disconnect algorithm are reproduced as Appendices A and B, respectively. It will be appreciated that the program routines are written in language for a National Semiconductor IPC-16A/500D microprocessor.

With continued reference to FIG. 3, the main signal path for an incoming line signal provided as the AGC amplifier output is to the message signal head, but an alternate path is to the announce signal head. To further explain, taking FIG. 2 in conjunction with FIG. 3, the AGC amplifier output signal from either a calling party or the subscriber is routed to node 200 shown in FIG. 3. If the incoming line signal is a message from a calling party to be recorded on the message tape, switch 202 is closed and the signal is coupled through capacitor 204 to the message signal head of a tape recorder. Processor 40 controls the condition of switch 202 by outputting a single-bit binary code on BUSS 1 to storage register 206. After the data bit is latched in register 206 at the occurrence of command strobe, it is made available from the $Q_A$ output of register 206 and applied via inverter 208 to a control input of switch 202.

Alternatively, if the incoming line signal is an announcement from the subscriber to be recorded on the announce tape, switch 202 is open and the signal is routed over the ANNOUNCEMENT line to switch 210 shown in FIG. 2. A record announcement command (RAC) is applied to the control input of switch 210 to cause closure thereof and make the signal at node 200 in FIG. 3 available to the announce signal head of the second tape recorder. The RAC command is obtained from processor 40 over BUSS 2. Again, the control signal available from processor 40 is a single bit binary code, the bit value of which is latched into a storage register 212 at the occurrence of command strobe and made available from the $Q_C$ output of register 212.

Referring again to FIG. 3, it will be observed that the AGC amplifier output signal is routed along a signal path 214 to reach node 200. The circuitry generally designated by reference numeral 216 is preferably included in the signal path between the AGC amplifier and node 200 in an automatic telephone message recording system having remote access message playback to modify an incoming line signal if that signal produces an incoming line signal status representative of dial tone, to prevent the incoming line signal from simulating dial tone during message playback.

In the embodiment of FIG. 3, the modification to the AGC amplifier output signal is that of inserting a blank interval or "hole" of a prescribed duration. The insertion of a blank interval is accomplished in the embodiment shown by breaking the circuit path 214 and routing the AGC amplifier output signal to ground. This is accomplished in the embodiment shown with switches 218 and 220 under the direction of the processor. The AGC amplifier signal is coupled to circuit path 214 through capacitor 222 and a bias network comprising resistors 224 and 226. The signal is then conducted through resistor 228 to node 230.

Switches 218 and 220 are controlled by the same single bit binary code output by processor 40 over BUSS 5 and stored in register 206. The $Q_B$ output of register 206 which makes available the control bit code is applied to an inverter 232. The output of inverter 232 is applied directly to switch 218 to control the operation thereof, and is further applied as an input to inverter 234 which provides the control signal for switch 220. It will be readily appreciated that switches 218, 220 will always be in opposite conditions; that is, when switch 218 is closed, switch 220 is open, and vice-versa.

Therefore, when switch 218 is closed, the AGC amplifier output signal is routed along circuit path 214 through resistor 236 to node 200. But when switch 218 is open, and switch 220 is closed, the AGC output signal at node 230 is routed to ground through capacitor 238.

Since the dial tone may be present for the full detection interval during recording operations, it is possible that in the caller message record mode or in the remote access announce record mode, dial tone would be recorded. In playback the recording would simulate dial tone and result in an inadvertent dial tone detection determination. To protect against an inadvertent dial tone detection determination, and permit simulated dial tone played back from tape to be distinguished from real dial tone, the processor controls switches 218 and 220 to insert a blank interval of prescribed duration into the AGC amplifier output signal. The process of inserting blank intervals in the AGC amplifier output signal may be referred to as "hole-punching".

In the preferred embodiment, hole-punching is incorporated as a part of the voice/dial tone detect algorithm. If the system is in a record mode, processor 40 monitors the output of signal detector 170, and when a steady tone is detected for a specified interval of time, a blank interval or "hole" is "punched" in the AGC amplifier output signal. So long as the steady signal appears at the input of signal detector 170, a blank interval is inserted periodically. In the preferred embodiment, the presence of a steady tone for 1.5 seconds causes a 30-millisecond blank interval to be inserted into the AGC output signal, with a blank interval being inserted every 1.5 seconds for as long as the steady signal is maintained. In playback, the 30-millisecond blank intervals or holes will be utilized to reset a disconnect timer as will be more fully understood from the discussion of the overall operation of the message recording system, and the calling party disconnect procedure in particular.

Turning again to FIG. 2, playback in the system may be from either the message tape or the announcement tape. Selection of the playback source is accomplished by routing the desired source through its respective connection switch. If the message tape is selected as the playback source, switch 250 is closed and the message signal (from FIG. 3) is passed to the input of playback amplifier 254. Switch 250 is controlled by playback message command (PMC) which is a signal derived from processor 40 via storage register 212. However, if the greeting announcement is the desired playback source, switch 250 is open and switch 252 is closed, passing the announcement signal to playback amplifier 254. Switch 252 is controlled by the playback announce command (PAC) which is also provided by processor 40 via storage register 212.

The output of playback amplifier 254 is provided via resistor 256 to switch 164, and via resistor 258 to the primary winding 260 of transformer 120. In normal operation with the line seizure relay 122 closed, the playback signal from amplifier 254 is transferred into secondary winding 118 and placed onto the central office lines. Further, by means of secondary winding 119 of transformer 120, the playback signal can be made available to the subscriber's telephone independently.

SYSTEM OPERATION

In operation, an incoming call produces a ringing voltage on the central office ring and tip lines 22, 24 which is detected by the ring detector circuitry and made available as a ring detect signal (RD) to processor 40. The processor counts the number of rings detected; and if the subscriber has not answered within a prescribed number of rings, the system will answer the incoming call. The call is answered by the processor outputting a control bit over BUSS 10 which is entered into storage register 160 upon the occurrence of COMMAND STROBE. The single bit code is output from the $Q_C$ output of register 160 and is applied to inverting relay driver 121 which energizes relay coil 123 and causes line seizure relay 122 to close. Simultaneously, processor 40 outputs a playback announce command (PAC) to switch 252 to connect the announce tape recorder to the playback amplifier. It will, of course, be appreciated that processor 40 also provides control signals for energizing the announcement tape drive. Following closure of relay 122, activation of the announcement tape drive, and closure of switch 210, the announcement is output via transformer 120 to the calling party.

If during the announcement the calling party hangs up, dial tone will appear on the line. In such event, dial tone mixed with the announcement voice signal constitutes the incoming line signal routed through isolation amplifier 150, switch 154 and AGC amplifier 156 to signal detector 170. Signal detector 170 responds by producing a "low" output and after six seconds of continuous dial tone the processor will determine that dial tone is present and will output a control signal to open relay 122, thereby disconnecting the system from the telephone line. Simultaneously, of course, the announce tape drive would be rewound and set up for the next incoming call.

If the calling party remains on the line throughout the announcement portion, the system will enter the message record mode. If the calling party is leaving a message, his voice on the line will produce a voice signal as the incoming line signal. Signal detector 170 will respond to the voice signal as previously described. If the output of signal detector 170 goes "low" for a period not less than 33 milliseconds, nor more than 160 milliseconds, following a previous "low", during a period of 12 seconds processor 40 will consider the calling party to be leaving a message and maintain connection to the telephone line. If, however, the output of signal detector 170 goes low and stays low for a period of 1.5 seconds, processor 40 considers that the incoming line signal is potentially dial tone and will insert a 30 millisecond blank interval in the signal being recorded.

If the calling party hangs up during the message recording portion, the output of signal detector 170 goes low and stays low in response to dial tone on the line. After finding that the output of signal detector 170 has been continuously low for a period of six seconds, the processor will determine that dial tone is present, meaning the calling party has hung up, and the system will be disconnected from the telephone line by opening relay 122.

In the remote access message playback mode, a message signal from the message recorder is applied to the playback amplifier and output to the telephone line. The message signal is also provided to the AGC amplifier and output therefrom to the signal detector 170. If dial tone has been previously recorded on the message tape, it will be provided to the signal detector. But for the insertion of 30 millisecond blank intervals in the dial tone signal prior to it being recorded, the playback of dial tone off the message tape would cause signal detector 170 to produce a status indication of a steady tone signal and after six seconds the processor would react to cause disconnection of the system from the telephone line. A recorded dial tone signal having 30 millisecond blank intervals, inserted therein will when applied to signal detector 170 result in a "high" output signal therefrom. This detector output condition, of course, defeats the requirement in the disconnect algorithm that the incoming line status indication must be continuously low for six seconds. However, when the calling party receiving the recorded message hangs up, real dial tone comes on the line and its presence is recognized, resulting in disconnection from the telephone line.

It is also to be appreciated that during message playback, should the calling party hang up, dial tone mixed with voice signals would be passed through the isolation amplifier and AGC amplifier. The presence of dial tone, even though mixed with voice signals, still results in a low output from signal detector 170. Thus, following the prescribed six-second time period, the system will be disconnected from the telephone line.

The capability of signal detector 170 to recognize the presence of a steady dial tone signal, regardless of the frequency, even if it is mixed with voice signals, is utilized to enable the system to detect dial tone during the announcement period and during remote access message playback.

It will further be appreciated that with the present invention, apparatus for detecting dial tone can conveniently be incorporated into an automatic telephone answering system utilizing the voice detection circuitry. The dual utilization of the voice detection circuitry obviates the necessity for the inclusion of separate dial tone detection circuitry.

APPENDIX A

```
PAGE   54    SHEP  PLANTRONICS 2K SYSTEM
VOICE QUERIES

.PAGE     'VOICE QUERIES'
2093                         .LOCAL
2094               ;
2095               ;         JSR       QVTO
2096                         .WORD     YES
2097               ;
2098                         QVTO:
2099  061C C30B A            LD        R0,V12TIM(R3)
2100  061D 4502 A             BOC      NZ,$1
2101                $NEWVP:                          ;NEW VOICE PULSE
2102  061E 1517 A            JSR       V12INIT
2103  061F 8001 A            RTS       1
2104               ;         TEST FOR LEADING EDGE OF A NEW PULSE
2105  0620 C0DD A  $1:       LD        R0,NEWSTAT
2106  0621 430B A            BOC       ODD,$NO         ;NO NEW PULSE
2107  0622 C0E4 A            LD        R0,PRESTAT
2108  0623 4301 A            BOC       ODD,.+2
2109  0624 190_ A            JMP       $NO             ;NO NEW PLACE
2110               ;         YES LEADING EDGE
2111  0625 C30A A            LD        R0,VPTIM(R3)
2112  0626 E0D3 A            ADD       R0,CLOCK
2113  0627 9447 B@           JSR       NCLKR1          ;NEQ CLOCK TO R1
2114  0628 D70A A            ST        R1,VPTIM(R3)
2115  0629 9D9D A            SKQ       R0,-33          ;33 MILLISECONDS MIN. TIME
2116  062A 1902 A            JMP       $NO             ;NOT NEW VOICE PULSE
2117  062B 9D9C A            SKQ       R0,-160
2118  062C 19F1 A            JMP       $NEWVP          ;160 MILLISECONDS MAX. TIME
2119                $NO:
2120               ;         CHECK IF 12 SECONDS ELAPSED
2121  062D C30B A            LD        R0,V12TIM(R3)
2122  062E E0D3 A            ADD       R0,CLOCK
2123  062F 9D99 A            SKQ       R0,-TPV12
2124  0630 1901 A            JMP       .+2
2125  0631 984D B@           JMP       RTSI            ;VOICE TIMED OUT
2126  0632 7001 A            CAI       R0,1
2127  0633 E195 A            ADD       R0,-TPV12
2128  0634 9595 A@           JSR       S12R
2129  0635 8001 A            RTS       1
2130               ;
2131               ;         VOICE TIME INITIALIZE
2132               ;
```

```
PAGE   54    SHEP  PLANTRONICS 2K SYSTEM
VOICE QUERIES
2133                        V12INIT:
2134 0636 9447 B@            JSR      NCLKR1
2135 0637 D70B A             ST       R1,V12TIM(R3)
2136 0638 D70A A             ST       R1,VPTIM(R3)
2137 0639 9591 A@            JSR      S12
2138 063A 2EE0 A             .WORD    12000
2139 063B 8000 A             RTS
2140 063C 0000 A             .POOL    6
     063D 0000 A
     063E 0000 A
     063F 0000 A
     0640 0000 A
     0641 0000 A
2141

PAGE   64    SHEP  PLANTRONICS 2K SYSTEM
CPC ROUTINE

.PAGE    'CPC ROUTINE'
2486                         LOCAL
2487
2488                  ;      CPCTIM:
2489                  ;      ALL 0 = NOT IN CALLER MODE
2490                  ;      BITS 2,1,0:
2491                  ;      000      TIMING FIRST 1.5 SECONDS
2492                  ;      001      TIMING FIRST 5 SECONDS
2493                  ;      101      TIMING FIRST 5 SECONDS BUT CPC HAS OCCURRED
2494                  ;      X10      > 5 SECONDS NO TIMING CURRENTLY
2495                  ;      X11      > 5 SECONDS TIMING PULSE WIDTH
2496                  ;
2497                  ;
2498                  ;      QUERRY CPC - IF YOU SET IDLE
2499                  ;
2500 074E C0E3 A  QCPC:   LD    R0,PRCRAC
2501 074F 4512 A          BOC   NZ,$RTS       ;<1 MS AFTER TURNING PRC OFF
2502 0750 C304 A          LD    R0,LOUT(R3)
2503 0751 B80F B          SKAZ  R0,=0100
2504 0752 1901 A          JMP   .+2
2505 0753 8000 A          RTS                 ;PRC ON
2506 0754 C30E A          LD    R0,CPCTIM(R3)
2507 0755 410C A          BOC   Z,$RTS
2508                  ;
2509 0756 430C A  $B1X:   BOC   ODD,$B11
2510              $B10:
2511 0757 C0DD A          LD    R0,NEWSTAT
2512 0758 4309 A          BOC   ODD,$RTS      ;NO PULSE
2513                  ;   START TIMING NEW CPC PULSE
2514 0759 C005 B          LD    R0,CPCMIN
2515 075A 9447 B@         JSR   NCLKR1
2516 075B 5C40 A          RCPY  R1,R0
2517 075C A586 A          OR    R0,=3         ;SET MODE 11
2518 075D D30E A          ST    R0,CPCTIM(R3)
2519 075E 945C B@         JSR   RSTCPR
2520 075F C304 A          LD    R0,LOUT(R3)
2521 0760 4401 A          BOC   BIT1,$RTS     ;NOT IN RECORD MODE
2522 0761 95B2 A@         JSR   SETCPR        ;IN RECORD MODE AT PULSE BEGIN
2523 0762 8000 A  $RTS:   RTS
2524
2525                  ;   11=TIMING PULSE WIDTH
2526 0763 E003 A  $B11:   ADD   R0,CLOCK
2527 0764 9C05 B          SKG   R0,CPCMIN
2528 0765 1901 A          JMP   .+2
2529 0766 190E A          JMP   $SIDL
2530 0767 9DD4 A          SKG   R0,=1500
2531 0768 1904 A          JMP   $200
2532 0769 9434 B@         JSR   GETBIT
2533 076A A8E2 A          AND   R0,PHPWRD
2534 076B 4101 A          BOC   Z,$200
2535 076C 95D0 A@         JSR   SETLTC        ;CYCLE LTC MODE
2536              $200:
2537 076D C0DD A          LD    R0,NEWSTAT
2538 076E 4301 A          BOC   ODD,$NJPUL
2539 076F 8000 A          RTS                 ;PULSE CONTINUES
```

```
PAGE  65     SHEP  PLANTRONICS 2K SYSTEM
CPC ROUTINE
───────────────────────────────────────────────────────────────────────────
2540                    ;         STOP PULSE TIMING
2541  0770  5002  A     $NOPUL:  LI    R0,2
2542  0771  D30E  A              ST    R0,CPCTIM(R3)
2543  0772  945C  B@             JSR   RSTCPR
2544  0773  945D  B@             JSR   RSTLTC
2545  0774  8000  A              RTS
2546                    ;
2547                    ;         SET IDLE
2548                    $SIDL:
2549  0775  C304  A              LD    R0,LOUT(R3)
2550  0776  4405  A              BOC   BIT1,$NMR          ;NOT MESSAGE RECORD
2551  0777  9434  B@             JSR   GETBIT
2552  0778  A8D5  A              AND   R0,CPRWRD
2553  0779  4102  A              BOC   Z,$NMR
2554                    ;         MESSAGE RECORD MODE
2555  077A  C5C3  A              LD    R1,=$BKSP          ;MUST BACKSPACE OVER RECORD
2556  077B  1904  A              JMP   $100
2557                    ;         (OT MESSAGE RECORD MODE
2558                    $NMR:
2559  077C  C43E  B              LD    R1,=SETIDL
2560  077D  5020  A              LI    R0,020
2561  077E  BB06  A              SKAZ  R0,CODE1(R3)
2562  077F  C5C4  A              LD    R1,=PBHGUP
2563                    $100:
2564  0780  D7C2  A              ST    R1,PTR(R3)
2565  0781  6400  A              PULL  R0
2566  0782  99C2  A@             JMP   FORCEI             ;FORCE INTERRUPT AS STATE CHANGE
2567                    ;
2568                    ;         INIT. CPC TIMER
2569                    ;
2570  0783  C005  B     ICPC:    LD    R0,CPCMIN
2571  0784  49DD  A              BOC   N,$RTS
2572  0785  9447  B@             JSR   NCLKR1
2573  0786  5C40  A              RCPY  R1,R0
2574  0787  A9BE  A              AND   R0,=0FFF8
2575  0788  4501  A              BOC   NZ,.+2
2576  0789  5008  A              LI    R0,8
2577  078A  D30E  A              ST    R0,CPCTIM(R3)
2578  078B  945C  B@             JSR   RSTCPR
2579  078C  8000  A              RTS
2580                    ;
2581                    ;         BACKSPACE OVER RECORD PART OF CPC TIMEOUT
2582                    ;
2583                    ;
2584                    $BKSP:
2585  078D  5000  A              LI    R0,0
2586  078E  D30E  A              ST    R0,CPCTIM(R3)
2587  078F  946C  B@             JSR   BACKSP
2588  0790  0105  A              .WORD 261
2589  0791  983E  B@             JMP   SETIDL
2590  0792  0000  A              .POOL 8
      0793  0000  A
      0794  0000  A
      0795  0000  A
      0796  0000  A
```

The foregoing description of the invention has been directed to a particular preferred embodiment for purposes of explanation and illustration. It will be apparent, however, to those skilled in this art that the present invention may be utilized in an automatic telephone answering system other than an automatic telephone answering and message recording system. It is the intention of the following claims to cover all equivalent modifications and variations as fall within the scope of the invention.

What is claimed is:

1. In an automatic telephone answering and message recording system having remote access message playback capability and including a message record tape, the improvement comprising:

a signal detector for monitoring the telephone line to detect incoming line signals, said signal detector producing a binary data signal indicative of the status of a detected incoming line signal to be recorded on the message tape as being a steady tone of any frequency in the audio spectrum;

a data processor coupled to the signal detector and receiving the binary data signal as a data input for evaluating the signal in accordance with prescribed criteria through a sequence of operations to determine: (a) the existence, over a first prescribed time interval, of a steady tone signal status indication from the signal detector and (b) whether the signal on the telephone line is dial tone;

the processor evaluating the signal for an uninterrupted existence of a steady tone signal status indication from the signal detector over a second prescribed time interval to determine that dial tone is on the telephone line;

processor actuated means for disconnecting from the telephone line in response to a determination that the telephone line signal is dial tone; and processor actuated means for inserting a blank interval of prescribed duration in an incoming line signal prior to recording on the message record tape upon a determination by the processor that a steady tone signal status indication has been in existence over the first prescribed time interval, thereby producing an interruption of the incoming line signal within a time period equal to the second prescribed time interval of the processor evaluations, so as to prevent a simulation of dial tone by the recorded signal and actuation of the disconnecting means.

* * * * *

UNITED STATES PATENT OFFICE
CERTIFICATE OF CORRECTION

Patent No. 4,314,103              Dated  February 2, 1982

Inventor(s)  DONALD R. WILSON

It is certified that error appears in the above-identified patent and that said Letters Patent are hereby corrected as shown below:

Column 5, line 7, "i.e." should read -- e.g. --.

Column 9, line 4, delete the comma after "low".

Column 9, line 5, add a comma after "seconds".

Column 5, line 43, "valued" should read -- values --.

*Signed and Sealed this*

*Twentieth* Day of *July 1982*

[SEAL]

*Attest:*

*Attesting Officer*

GERALD J. MOSSINGHOFF

*Commissioner of Patents and Trademarks*